United States Patent [19]

Sato

[11] Patent Number: 5,151,875
[45] Date of Patent: Sep. 29, 1992

[54] MOS ARRAY MULTIPLIER CELL

[75] Inventor: Tai Sato, Mountain View, Calif.

[73] Assignee: C-Cube Microsystems, Inc., San Jose, Calif.

[21] Appl. No.: 770,738

[22] Filed: Oct. 2, 1991

Related U.S. Application Data

[63] Continuation of Ser. No. 494,607, Mar. 16, 1990, abandoned.

[51] Int. Cl.[5] .......................... G06F 7/50; G06F 7/52
[52] U.S. Cl. ...................................... 364/784; 364/758
[58] Field of Search .............................. 364/758-760, 364/784; 307/471-472

[56] References Cited

U.S. PATENT DOCUMENTS

| | | | |
|---|---|---|---|
| 4,363,107 | 12/1982 | Ohhashi et al. | 364/758 |
| 4,369,500 | 1/1983 | Fette | 364/758 |
| 4,575,812 | 3/1986 | Kloker et al. | 364/760 |
| 4,752,905 | 6/1988 | Nakagawa et al. | 364/760 |
| 4,831,578 | 5/1989 | Bui | 364/784 |
| 4,901,270 | 2/1990 | Galbi et al. | 364/759 X |
| 4,916,336 | 4/1990 | Houston | 307/449 |

*Primary Examiner*—Tan V. Mai
*Attorney, Agent, or Firm*—Skjerven, Morrill, MacPherson, Franklin & Friel

[57] ABSTRACT

A complementary metal-oxide semiconductor (CMOS) array multiplier cell comprising two CMOS equivalence circuits for sum generation, two pass transistors and an inverter for carry generation, and a multiplier selector built of a matrix of identical selection elements, a single field effect transistor (FET) switch and an inverter. Each of the selection elements consists of an N-channel FET, a P-channel FET and an inverter. Each equivalence circuit utilizes six transistors: four FET's and an inverter. Total cell device count is 31 to 39 transistors, depending on implementation alternatives.

5 Claims, 8 Drawing Sheets

| V | W | 72 | 74 | 76 | 78 | OUTPUT |
|---|---|----|----|----|----|--------|
| 0 | 0 | OFF | OFF | ON | OFF | 1 |
| 1 | 1 | ON | ON | OFF | ON | 1 |
| 0 | 1 | ON | ON | ON | OFF | 0 |
| 1 | 0 | OFF | OFF | OFF | ON | 0 |

MOS ARRAY MULTIPLIER CELL

This application is a continuation of application Ser. No. 07/494,607, filed Mar. 16, 1990, now abandoned.

FIELD OF THE INVENTION

This invention relates to a digital multiplier for use in digital signal processing and similar applications. It is particularly characterized by a full adder cell which has a small transistor count, and by small die area requirements.

BACKGROUND OF THE INVENTION

In digital signal processing, one of the most frequent operations which must be performed is the multiplication of two digital numbers. Often, hundreds or thousands of multiplications must be performed to execute a complex operation, such as computing a transform.

At its most basic level, binary multiplication is performed by multiplying each digit of the multiplicand with each individual digit of the multiplier, each such multiplication forming a partial product. If the multiplier bit is 0, the partial product is 0. If the multiplier bit is 1, the partial product is the multiplicand itself. In multiplication by a single bit, no carries are generated. Starting with the least significant bit, successive partial products are shifted one position to the left. The product is then the sum of the partial products. In the general case, the product can have a number of bits one greater than the sum of the multiplicand and multiplier bits, due to the generation of a carry bit.

Much attention has therefore been focussed on the design of high speed multipliers. This attention is directed at developing improved algorithms for multiplying digital numbers—i.e., more efficient architectures, requiring fewer operational steps—and at developing faster hardware, such as the constituent adders. In terms of architecture, two major portions are involved in a multiplier, the inner (i.e., partial) product generator and the partial product reduction mechanism. Algorithms for generating partial products include the straightforward AND array, the Pezaris array, the Booth algorithm and the modified Booth algorithm. The product reduction portion of the multiplier uses an array of adders to form the final product output, with the structure of the array being dependent on the algorithm chosen for partial product generation.

Most digital multipliers are based on the Booth algorithm (described, for example, in L. R. Rabiner and B. Gold, *Theory and Application of Digital Signal Processing*, Prentice-Hall, Inc., 1975, at 517–518, which is hereby incorporated by reference), which has played a major role in the implementation of fast multipliers. The basic idea of Booth's algorithm is to skip over individual iterations on an iterative shift-and add implementation of multiplication. The algorithm skips over 0 bits in the multiplier, which is a fairly obvious optimization, but it also skips over sequences of consecutive bits which are all 1's. The idea is that a sequence of N 1's in the multiplier is numerically equal to $2^N-1$, so the effect of multiplying by this sequence is the same as a subtraction in the least significant position, followed by an addition N positions to the left. This reduces multiplication to a single addition and subtraction for each consecutive string of 1's in the multiplier.

Figure 1:
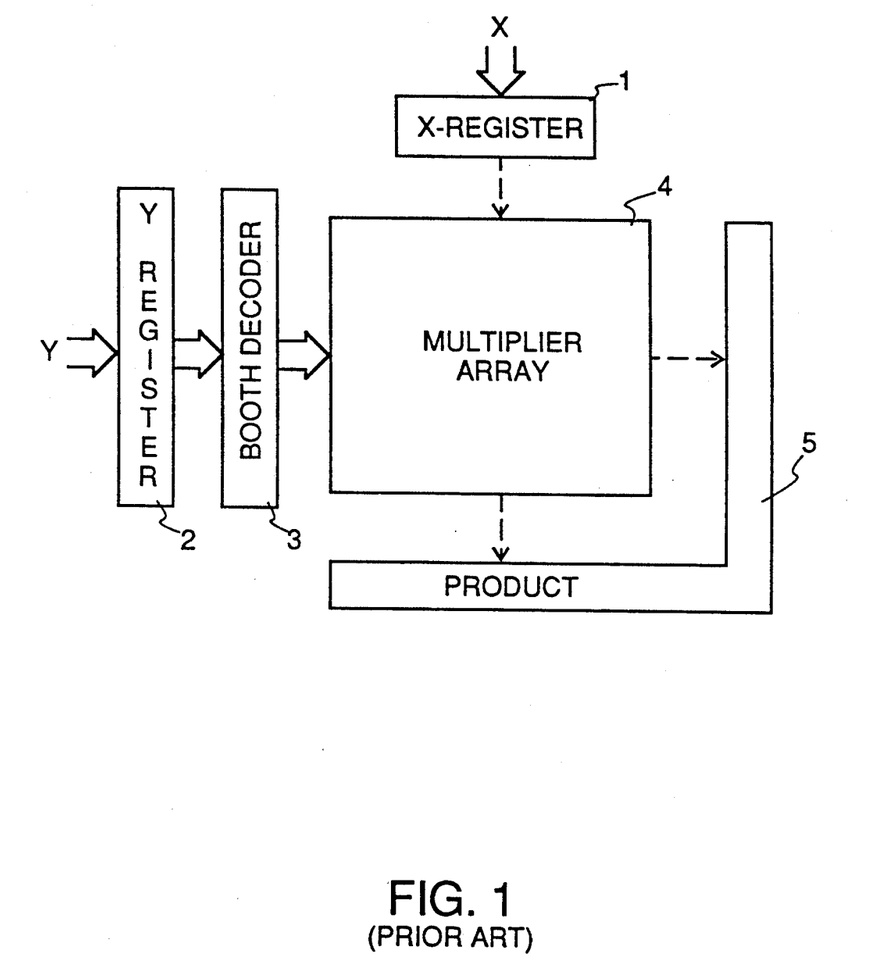
FIG. 1 is a block diagram of a conventional array multiplier according to the prior art, based on the Booth algorithm.

A typical array multiplier based on the Booth algorithm is shown in block diagram form in FIG. 1. The multiplicand is supplied to the X register 1, and the multiplier to the Y register 2. The Y register feeds a Booth decoder 3, which controls the operation of an array of full adders 4. The final product is formed by a collection of adders operating on the partial products which appear at the right hand side and bottom of the array.

Figure 2:
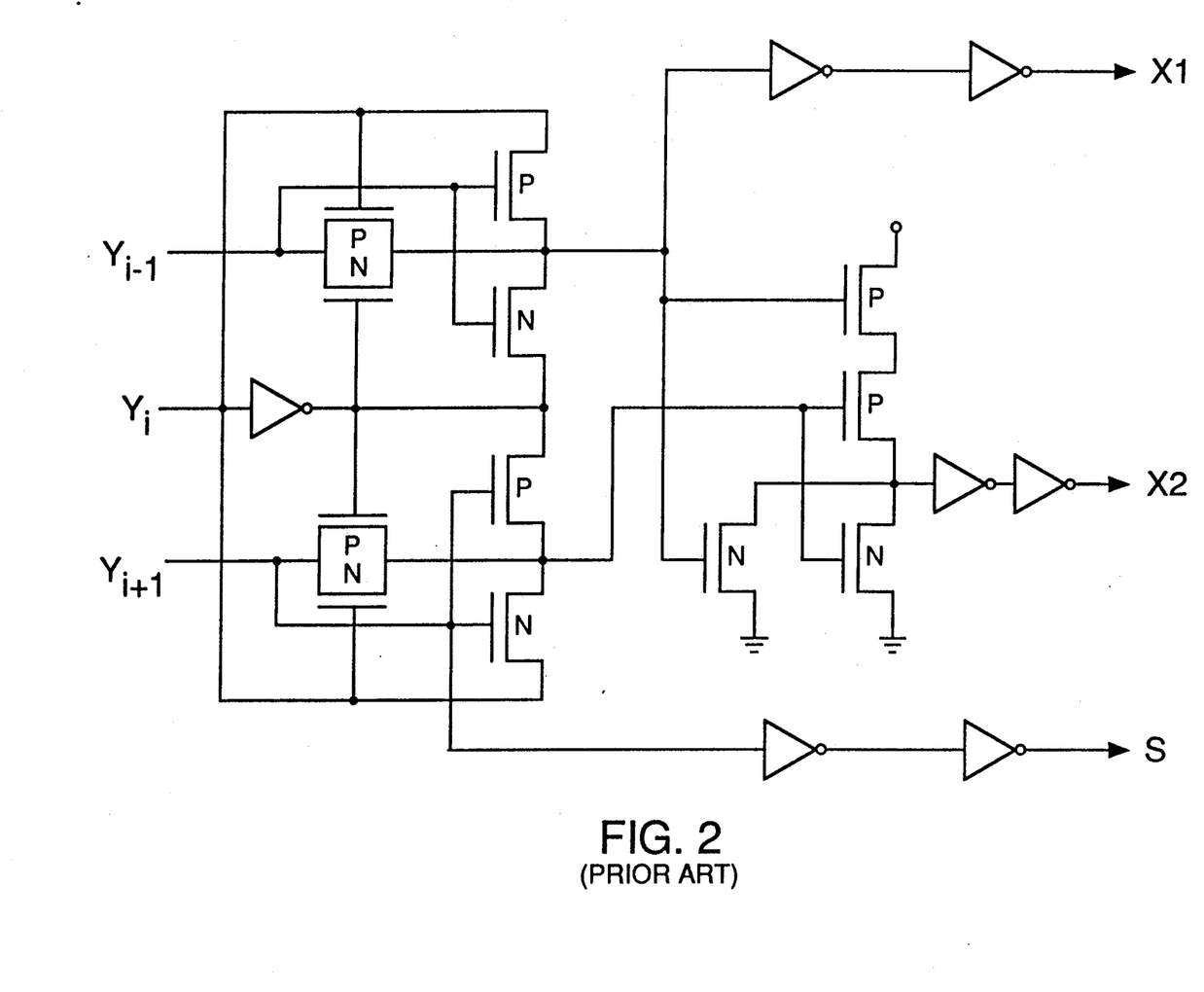
FIG. 2 is a schematic circuit diagram of a typical prior art Booth encoder, such as may be used with the present invention to provide an efficient array multiplier.

A typical second order Booth encoder is shown in FIG. 2. It receives three consecutive bits from the Y-register, and provides three output signals: X1, X2 and S. The S signal indicates whether to use the appropriate one of the X1 and X2 signals, or their complements. Use of these signals will be discussed below, in connection with the present invention.

Figure 3:
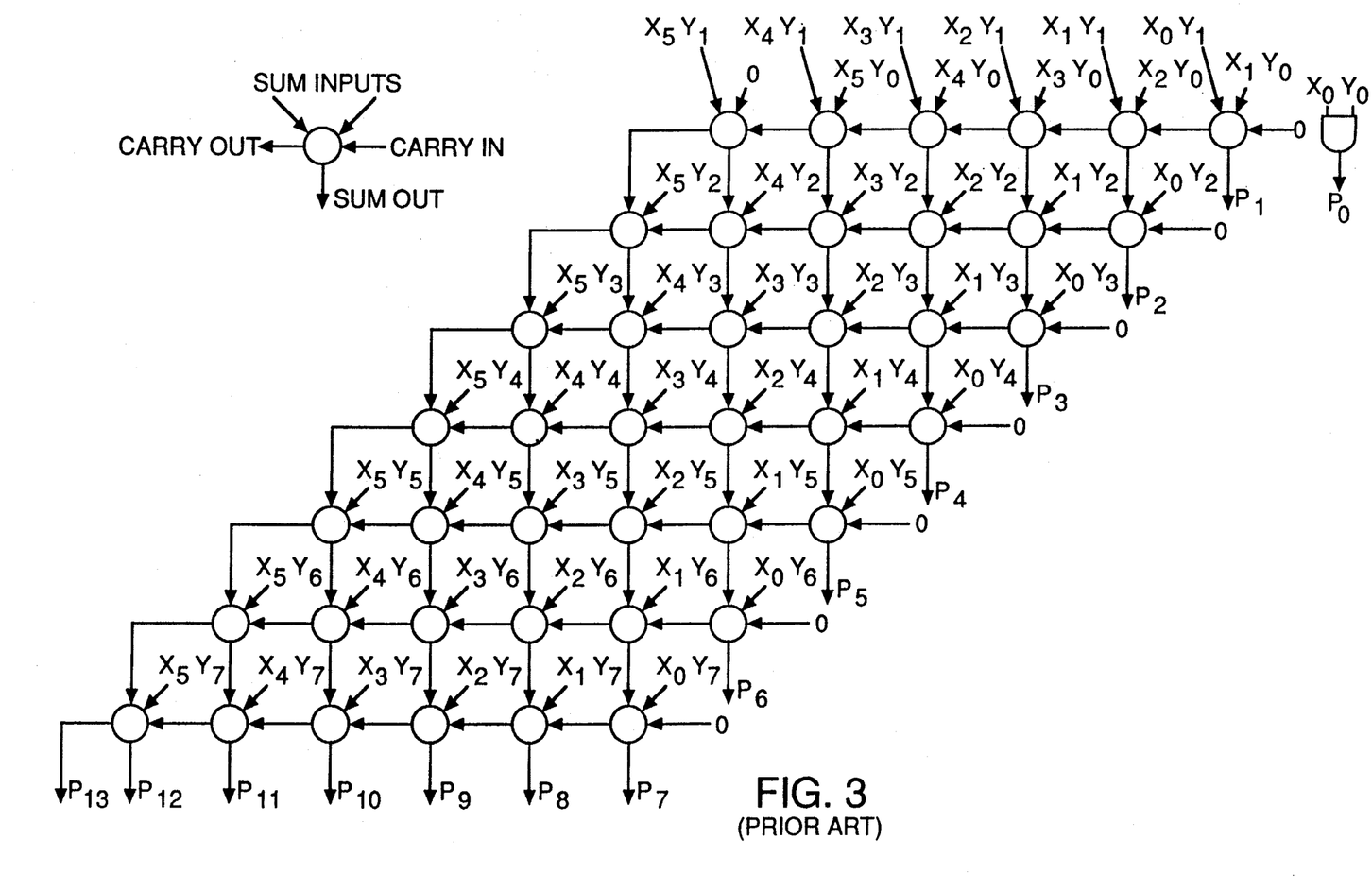
FIG. 3 is a diagrammatic illustration of a full adder array for use in an array multiplier such as that shown in FIG. 1.

The array 4 is, as aforesaid, generally a two-dimensional array of one bit adders. An exemplary array is shown in FIG. 3. As this is not a clocked logic system, a certain amount of time must be allowed between the application of the input signals (i.e., multiplier and multiplicand) and the availability of the output (i.e., product). This time is a result of the fact that partial sums and carries take finite time to be generated and to propagate from level to level in the array. Though the constituent building blocks may be small and fast, there are usually a large number of them. Thus, array performance is critically dependent on the speed of the adders.

Moreover, the die area of each adder (and thus its parts count), as well as its power consumption, also is multiplied by the number of unit cells, in arriving at the overall array multiplier. Even small changes in adder design may therefore produce large changes in multiplier performance. Minimization of power consumption and die area are ever-present goals of the integrated circuit "chip" designer. Faster hardware, though, often requires increased power consumption and faster algorithms often require more die area, so that more operations can be executed in parallel. Thus, these constraints can work at cross purposes.

According to the state of the art, the simplest full CMOS Booth multiplier cell requires about forty transistors and nine large conductive traces, which consume precious die area.

It is thus an object of the present invention to provide an improved digital multiplier.

Another object of the present invention is to provide an improved CMOS full adder and selector cell for an array multiplier.

It is another object of the invention to provide a full adder (and selector) cell which requires fewer than forty transistors.

A still further object of the invention is to provide a full adder cell which when assembled into an array requires fewer selector circuits and thereby consumes small die area.

SUMMARY OF THE INVENTION

These and other objects are achieved in a CMOS array multiplier cell comprising two CMOS equivalence circuits for sum generation, two pass transistors and an inverter for carry generation, used with a multiplier selector built of a matrix of identical selection elements, a single FET switch and an inverter. Each of the selection elements consists of an N-channel FET, a P channel FET and an inverter. Each equivalence circuit utilizes six transistors: four FET's and an inverter. Total cell device count is 31 to 39 transistors, depending on implementation alternatives. In addition to a reduced transistor count, the cell exhibits reduced die area and increased speed.

Each of the equivalence circuits generates a logical 1 output only when its two inputs are the same. The first equivalence circuit compares a carry input signal from the immediately less significant bit position in the same row of the array with the multiplier signal from the selector. It produces as an output function a signal labelled $S_1$. The second equivalence circuit compares the $S_1$ signal from the first equivalence circuit with the complement or negation, $S_{in}*$, of the sum signal $S_{in}$ from the same column (i.e., bit significance) position in the immediately preceding row of the array. (In general, an asterisk is used herein to indicate a logical complement.) The output of the second equivalence circuit is the new sum signal, Sum; that signal is complemented by an inverter for use by the next adder.

The invention will be more fully understood from the detailed description presented below, which should be read in conjunction with the accompanying drawing.

DETAILED DESCRIPTION

Figure 4:
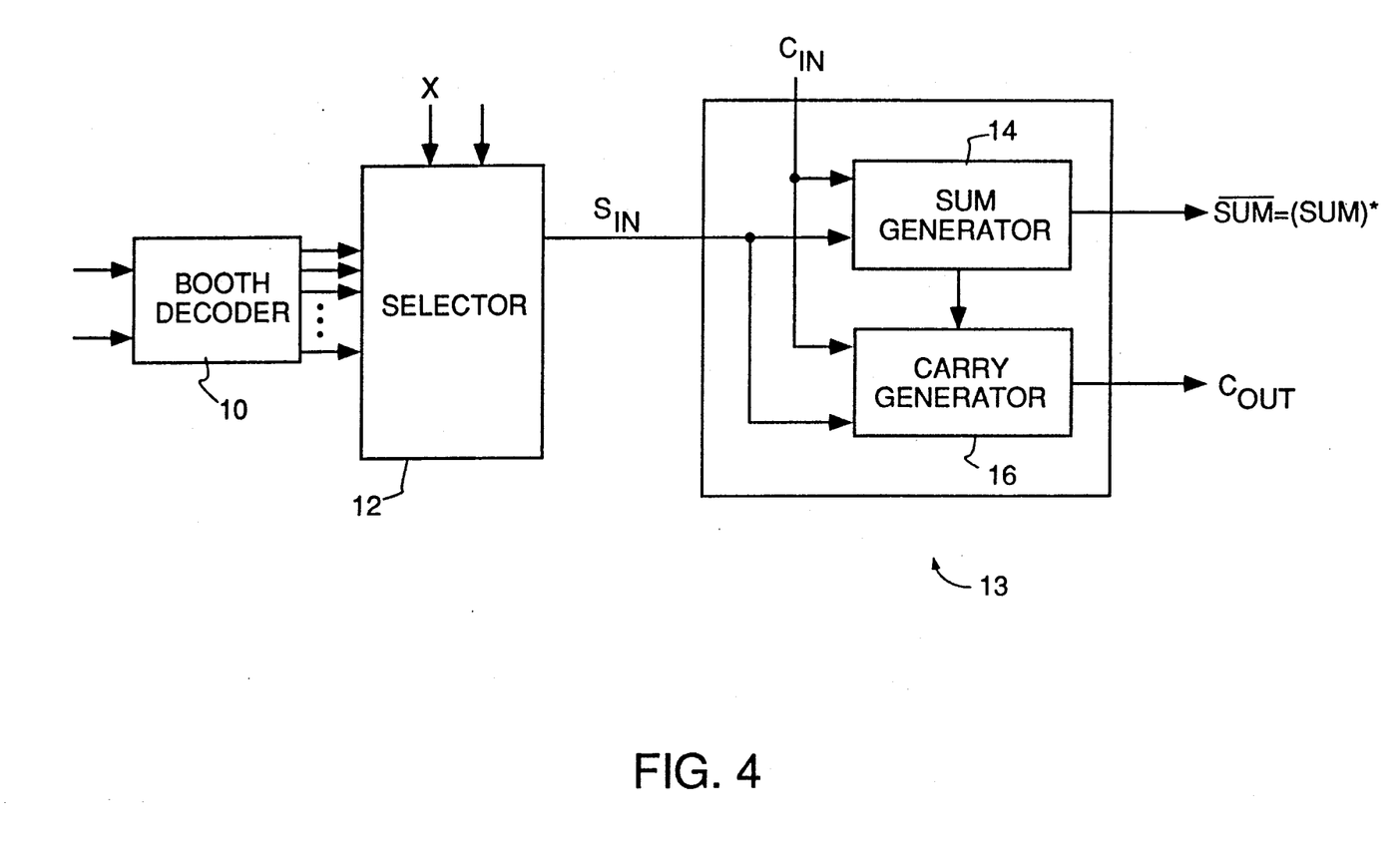
FIG. 4 is a cell diagram of an array multiplier according to the invention.

Referring now to FIG. 4, the invention is shown in block diagram form, as comprising a standard Booth decoder (or encoder) 10, a Booth multiplier selector 12, and a full adder array 13. In the array, each adder is formed from a sum generator 14 and a carry generator 16. For the sake of clarity of presentation, only one adder (i.e., one sum generator and one carry generator) is shown, it being understood that there are multiple adders arranged in an array such as the array of FIG. 3.

Figure 5:
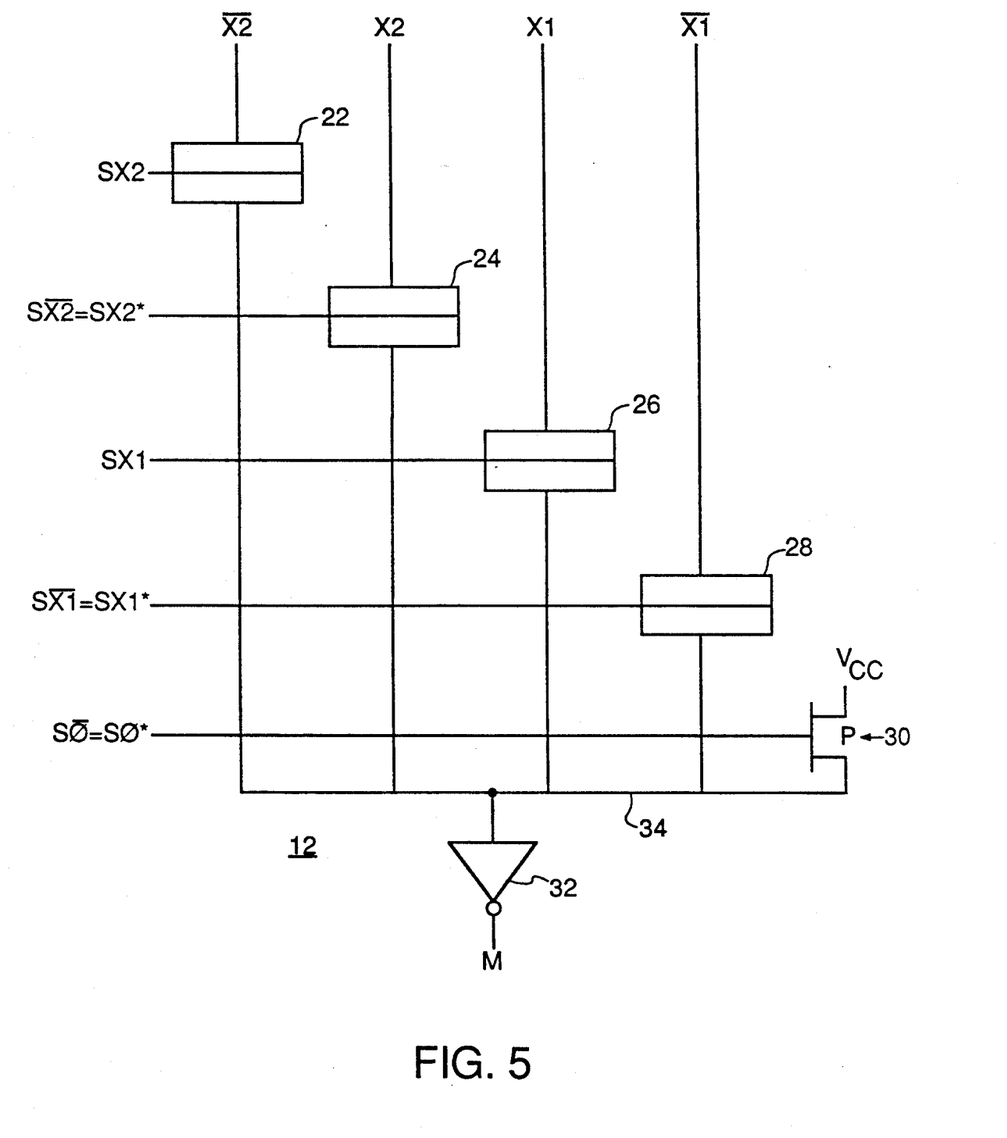
FIG. 5 is a schematic circuit diagram of the Booth selector of FIG. 4.

The multiplier selector 12 is illustrated in greater detail in FIG. 5. As is apparent, the selector is built of a matrix of identical selection elements 22, 24, 26 and 28, a single FET switch 30 and an inverter 32. Each of the selection elements receives one horizontal input (from the left on the drawing) and one vertical input (from the top) on the drawing. The outputs of the selection elements are wired together at node 34, to which the drain of FET 30 is also connected. However, as the input signals SX2, SX2*, SX1, SX1* and S0* are mutually exclusive, only one of the corresponding signals X2, X2*, X1, X1* and Vcc is connected to node 34 at any given time.

Figure 6:
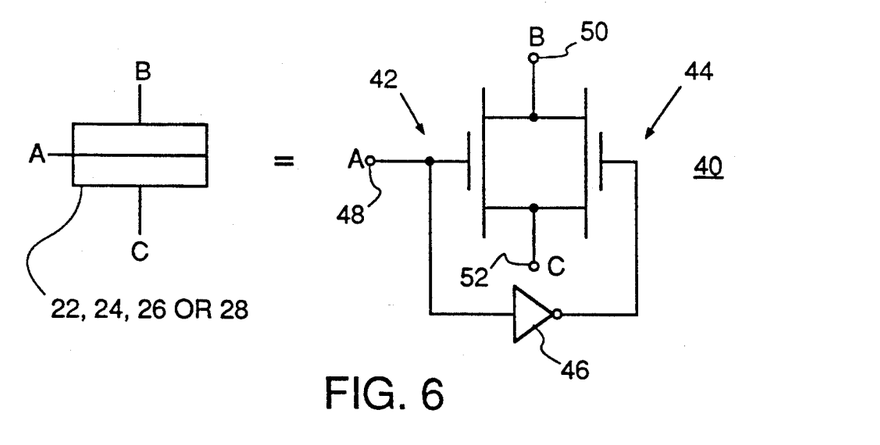
FIG. 6 is more detailed schematic circuit diagram of a selection element used in the selector of FIG. 5.

To explain the operation of the selection element matrix, a slight digression will be beneficial. FIG. 6 depicts in detail a representative selection element 40. Element 40 consists of an N channel FET 42, a P channel FET 44 and an inverter 46. The drains of the FET's are connected together, as are their sources. The input of the inverter and the gate of the N channel device are connected to a first input node 48. The output of the inverter is connected to the gate of the P-channel device. The drains are connected to a second input node 50. Node 48 is the horizontal input of the selection element, while node 50 is the vertical input. The sources of the FET's are connected to a node 52, which is the elements's output node. When the signal applied to the node 48 is a 1, the signal at node 50 is fed through to the output, node 52. Otherwise, the output node "floats."

With this background, attention is redirected to FIG. 5. It will now be understood that the operation of the selection array is controlled by the horizontally applied input signals. The input SX2 (i.e., the Booth selector output signal S from the Booth encoder, ANDed with the signal X2) controls element 22; the input SX2* (where the asterisk denotes a complement) controls element 24; the input SX1 controls element 26; the input SX2* controls element 28; and the input S0* controls transistor 30. When turned "on" by application of a 1 to its horizontal input, element 22 supplies input signal X2 to node 34. Similarly, element 24 supplies the complementary input X2*, element 26 supplies the input X1 and element 28 supplies the complementary input X1*. Input X1 is high (i.e., a 1) when an "add one" operation is indicated by the Booth encoder. Input X2 is high when an "add two" operation is indicated. Input X2* is selected to subtract two and input X1* is selected to subtract one. Vcc is selected for adding 0. See Table I, below.

TABLE I

| $Y_i$ | $Y_{i-1}$ | $Y_{i-2}$ | select | next stage |
|---|---|---|---|---|
| 0 | 0 | 0 | 0 (0) | 0 |
| 0 | 0 | 1 | +1 (X1) | 0 |
| 0 | 1 | 0 | +1 (X1) | 0 |
| 0 | 1 | 1 | +2 (X2) | 0 |
| 1 | 0 | 0 | −2 (X2)* | +4 ($Y_{i-2}$) |
| 1 | 0 | 1 | −1 (X1)* | +4 ($Y_{i-2}$) |
| 1 | 1 | 0 | −1 (X1)* | +4 ($Y_{i-2}$) |
| 1 | 1 | 1 | 0 (0) | +4 ($Y_{i-2}$) |

In the Booth decoder, the number of transistors per cell can be reduced by providing both uncomplemented and complemented versions of the signals SX2, SX2*, SX1, and SX1* In that case, the inverter 46 of FIG. 6 may be omitted.

Figure 7:
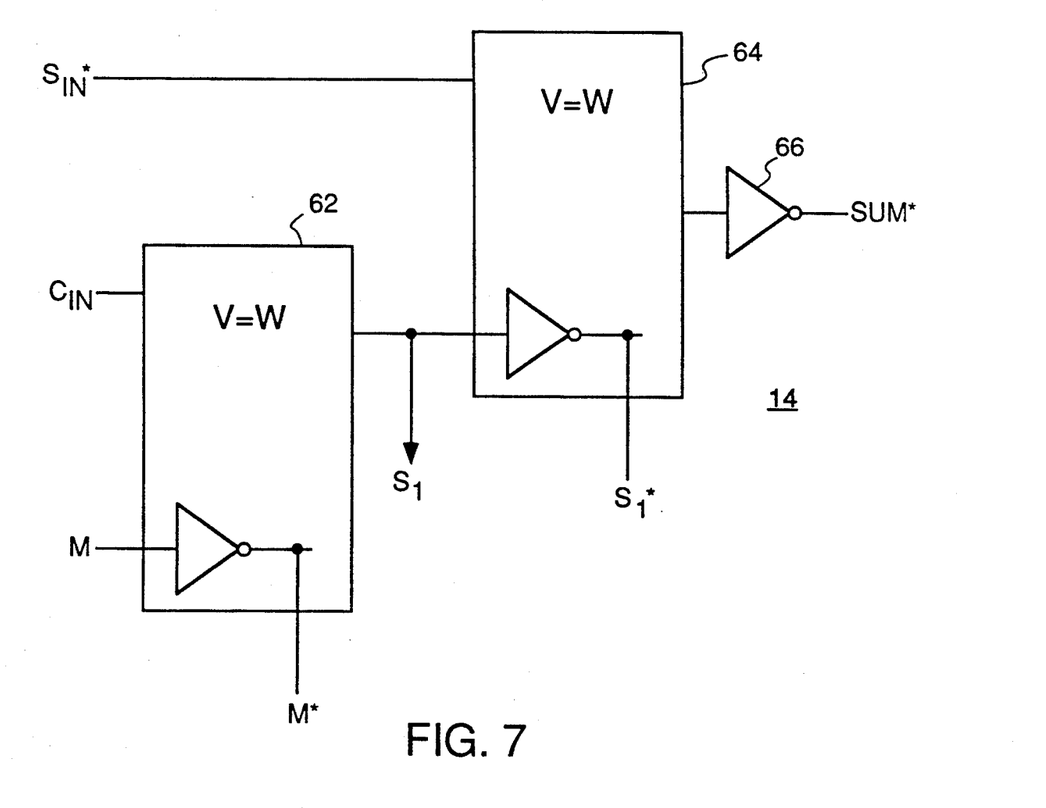
FIG. 7 is a partially block, partially schematic circuit diagram of the sum generator of a full adder according to the present invention.
Figure 9:
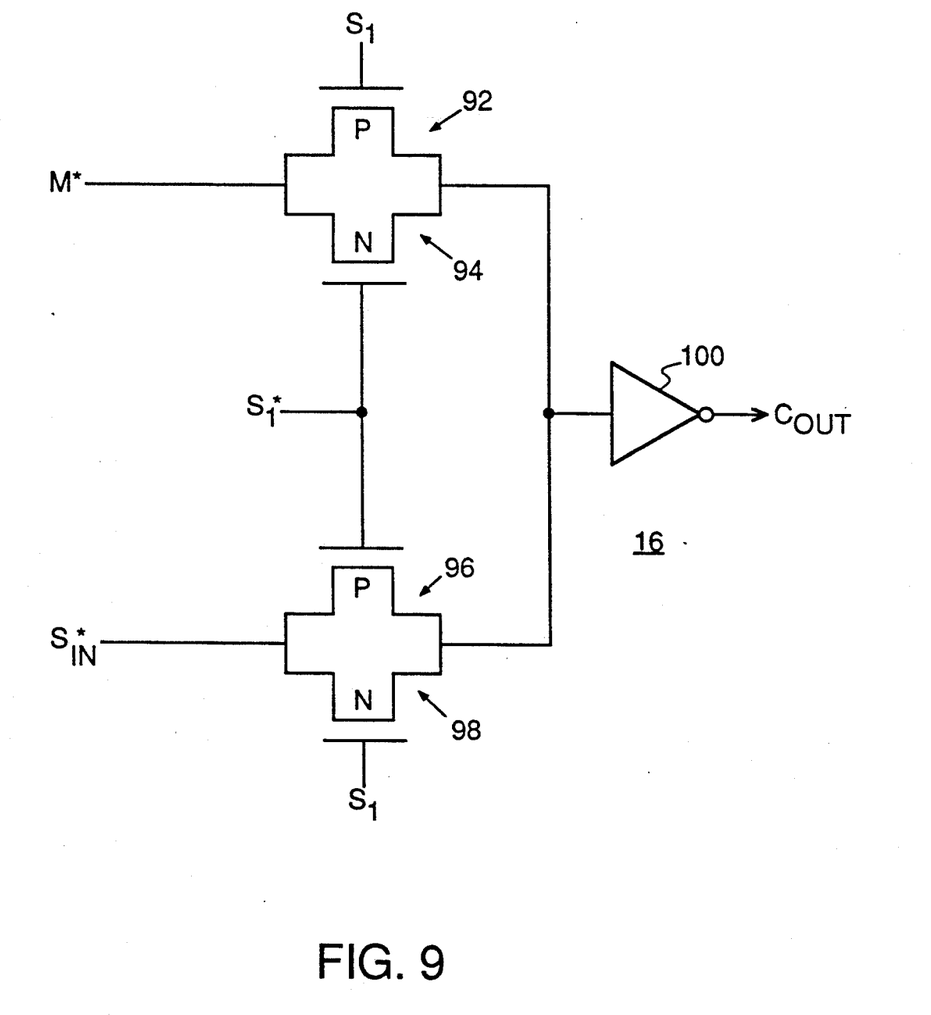
FIG. 9 is a partially block, partially schematic circuit diagram of the carry generator of a full adder according to the present invention.

The sum generator 14 is shown in a more detailed block form in FIG. 7. As illustrated, the sum generator comprises two identical two-input, one-bit equivalence circuits 62 and 64, and (preferably) an inverter 66. Each of the equivalence circuits generates a logical 1 output only when its two inputs are the same. First equivalence circuit 62 compares a carry input signal $C_{in}$ from the immediately less significant bit position in the same row of the array with the multiplier (M) signal from selector 12. It produces as an output function a signal labelled $S_1$. At no cost, it also provides the complement to the M input, M*. The second equivalence circuit 64 compares the $S_1$ signal from first equivalence circuit 62 with the complement or negation, $S_{in}*$, of the sum signal $S_{in}$ from the same column (i.e., bit significance) position in the immediately preceding row of the array. The output of the second equivalence circuit is the new sum signal, Sum; that signal is complemented by inverter 66 for use by the next adder. Additionally, equivalence circuit 64 provides an $S_1*$ signal at no added cost. This is convenient because the latter signal is used in the carry generator, which is shown in FIG. 9 and will be discussed below.

Figure 8A:
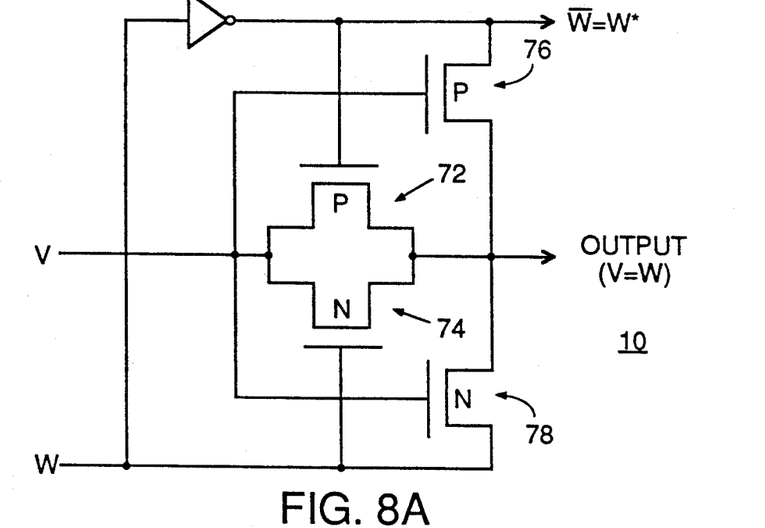
FIG. 8(a) is a schematic circuit diagram of a first (i.e., CMOS) embodiment of an equivalency circuit according to the present invention, for use in the sum generator of FIG. 7.
Figure 8B:
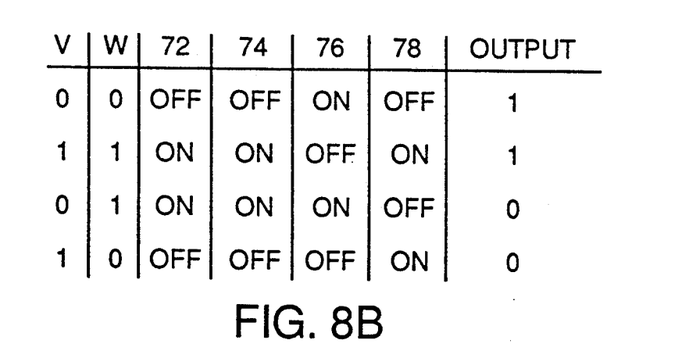
FIG. 8(b) is a table explaining the operation of the circuit of FIG. 8(a)
Figure 8C:
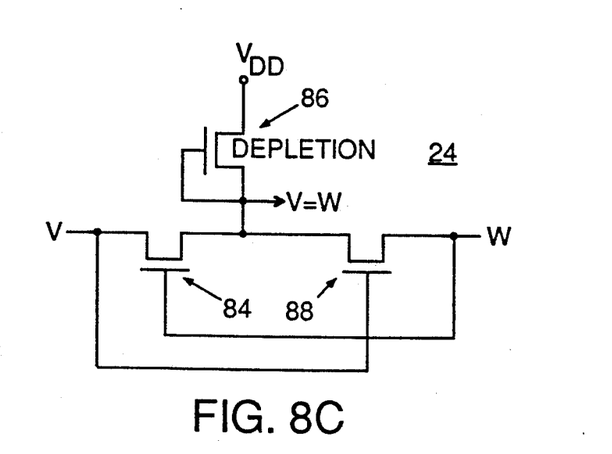
FIG. 8(c) is a schematic circuit diagram of a second (i.e., NMOS) embodiment of an equivalency circuit according to the present invention, for use in the sum generator of FIG. 7.

First, however, to complete the explanation of the sum generator, reference is made to FIGS. 8(a) and 8(c), which show two exemplary embodiments for the equivalence circuits used to build the sum generator. The two inputs of the equivalence circuit are labelled V and W, arbitrarily, and the output signal is labelled V=W. The equivalence circuit illustrated in FIG. 8(a) is useful in a CMOS fabrication. It utilizes four FET's 72, 74, 76 and 78, and an inverter 82. FET's 72 and 76 are p-channel devices, while FET's 74 and 78 are n-channel devices. The pair of FET's 72, 74 is usually termed a pass transistor or transmission gate. Note that the inverter 82, which ensures that transistors 72 and 74 are complementarily driven, supplies a W* output at no added cost in components or die area. Assuming two transistors for the inverter, this circuit has just six transistors.

FIG. 8(b) provides a self-explanatory table showing the operation of the equivalency circuit of FIG. 8(a).

The circuit shown in FIG. 8(c) is used in an NMOS fabrication. It utilizes only three transistors (84, 86 and 86); however, it has the disadvantage that a low level signal is driven by the output of a previous stage, and it consumes DC power through transistor 86.

The carry generator is shown in FIG. 9. As will be seen there, the carry generator requires just four transistors (i.e., two pass transistors) and an inverter. FET's 92 and 94 are p-channel devices, while FET's 96 and 98 are n-channel devices. The gates of FET's 92 and 98 are connected to receive the $S_1$ signal, while the gates of FET's 94 and 96 are connected to receive the $S_1*$ signal. The drains of all of the transistors are connected together and to the input of an inverter 100. The sources of FET's 92 and 96 are connected together to receive the M* signal, while the sources of the FET's 94 and 98 are connected together to receive the $S_{in}*$ signal. The carry out signal for the stage, $C_{out}$, appears at the output of inverter 100.

It will be seen that the total transistor counts for the constituent members of the multiplier cell are as follows:

| Adder circuit | | |
|---|---|---|
| equivalence circuits | 2 × 6 = | 12 |
| sum generator | | 2 |
| carry generator | | 6 |
| | subtotal | 20 |
| Booth selector | | |
| selector | 4 × 4 = | 16 |
| 0 selector | | 1 |
| inverter | | 2 |
| | subtotal | 19 |
| | total | 39 |
| or | | |
| selector | 2 × 4 = | 8 |
| 0 selector | | 1 |
| inverter | | 2 |
| | subtotal | 11 |
| | total | 31 |

Thus this design permits construction of a multiplier array which requires only about 20 ns (maximum) for a 16 bit by 16 bit multiplication and uses only about four to ten transistors per cell. This latter fact alone leads to a reduction in die area and power consumption. A further reduction in die area is accomplished by virtue of the fact that the circuitry lends itself to a topological layout in which fewer and smaller metal connections are required between transistors. The circuitry is also CMOS and operates with a full voltage swing, assuring a wider noise margin. And as a fully buffered circuit, it does not cause any signal attenuation.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested to be suggested hereby, and are within the spirit and scope of the invention. Accordingly, the invention is limited only by the following claims and equivalents thereto:

What is claimed is:

1. An array multiplier cell, receiving first, second and third input signals, and providing a carry-out signal and a sum signal, said array multiplier cell comprises:

sum generation means receiving said first, second and third input signals for providing said sum signal, said sum generation means comprising first and second equivalence circuits, each equivalence circuit receiving first and second equivalence input signals and providing first and second equivalence output signals, said first equivalence output signal having a logic state in accordance with whether the logic states of said first and second equivalence input signals are the same, said second equivalence output signal being the inverted signal of said second equivalence input signal, said first equivalence circuit receiving as first and second equivalence input signals respectively said first and second input signals, and said second equivalence circuit receiving as first and second equivalence input signals respectively said first equivalence output signal of said first equivalence circuit and said third input signal, said sum generation means further comprises means for inverting said first equivalence output signal of said second equivalence circuit to provide said sum signal; and carry generation means receiving first, second, third and fourth input carry input signals, respectively coupled to said third signal, said first equivalence output signal of said first equivalence circuit, said second equivalence output signal of said first equivalence circuit, and said second equivalence output signal of said second equivalence circuit for providing said carry-out signal.

2. An array multiplier cell as in claim 1, wherein said carry generation means comprises:
multiplexer means controlled by said second and fourth carry input signals for selecting as output one of said first and third carry input signals; and
means for inverting said output signal of said multiplexer to provide said carry-out signal.

3. An array multiplier cell as in claim 2, wherein said multiplexer comprises transfer gates.

4. An array multiplier cell as in claim 1, wherein each equivalence circuit comprises:
a static CMOS inverter for inverting said first equivalence input signal;
a CMOS complex inverter having pull-up and pull-down transistors for inverting said second equivalence input signal, said pull-up transistor having a source terminal connected to receive said inverted first equivalence input signal, said pull-down transistor having a source terminal connected to receive said first equivalence input signal, said CMOS complex inverter providing said first equivalence output signal when said first equivalence input signal is in the logic low state; and
a CMOS transfer gate for providing as said first equivalence output signal said second equivalence input signal when said first equivalence input signal is in the logic high state.

5. An array multiplier cell as in claim 1, wherein each equivalence circuit comprises:
a depletion mode NMOS transistor have a source, gate, and drain terminals, said drain terminal of said depleting mode NMOS transistor connected to receive a supply voltage, said gate and source terminals connected together to provide said first equivalence output signal of said equivalence circuit;
first NMOS transistor having gate, source and drain terminals, said drain terminal of said first NMOS transistor connected to receive said first equivalence input signal, said gate terminal of said first NMOS transistor connected to receive said second equivalence input signal, and said source terminal of said first NMOS transistor connected to said source terminal of said depletion mode NMOS transistor; and
second NMOS transistor having gate, source and drain terminals, said drain terminal of said second NMOS transistor connected to receive said second equivalence input signal, said gate terminal of said second NMOS transistor connected to receive said frist equivalence input signal, and said source terminal of said second NMOS transistor connected to said source terminal of said depletion mode NMOS transistor.

* * * * *

UNITED STATES PATENT AND TRADEMARK OFFICE
CERTIFICATE OF CORRECTION

PATENT NO. : 5,151,875
DATED : September 29, 1992
INVENTOR(S) : Tai Sato

It is certified that error appears in the above-indentified patent and that said Letters Patent is hereby corrected as shown below:

Column 5, line 39, delete "86" and insert --88--.

Column 8, line 7, delete "depleting" and insert --depletion--.

Column 8, line 26, delete "frist" and insert --first--.

Signed and Sealed this

Fourth Day of January, 1994

Attest:

BRUCE LEHMAN

*Attesting Officer*  Commissioner of Patents and Trademarks